US008060999B2

(12) United States Patent
Fistor

(10) Patent No.: US 8,060,999 B2
(45) Date of Patent: Nov. 22, 2011

(54) SNAP RING INSTALLATION TOOL

(76) Inventor: Lorae A. Fistor, Santa Rosa, CA (US)

( * ) Notice: Subject to any disclaimer, the term of this patent is extended or adjusted under 35 U.S.C. 154(b) by 0 days.

(21) Appl. No.: 11/681,651

(22) Filed: Mar. 2, 2007

(65) Prior Publication Data

US 2007/0204451 A1 Sep. 6, 2007

Related U.S. Application Data

(60) Provisional application No. 60/778,717, filed on Mar. 2, 2006.

(51) Int. Cl.
*B23P 19/02* (2006.01)

(52) U.S. Cl. .............. 29/229; 81/3.55; 81/3.57; 29/235; 29/270

(58) Field of Classification Search .................... 29/229, 29/235, 239, 213.1, 270, 255; 81/3.55, 3.47, 81/3.57, 3.37, 3.4, 3.42, 3.29, 3.15, 3.07, 81/3.05; 294/12, 25, 11, 6, 9; 30/228
See application file for complete search history.

(56) References Cited

U.S. PATENT DOCUMENTS

| | | | | | |
|---|---|---|---|---|---|
| D67,714 | S * | 6/1925 | Momberger | .................. | D7/653 |
| 2,545,979 | A * | 3/1951 | Tregear | .......................... | 81/3.57 |
| 2,761,338 | A * | 9/1956 | Hardy | .......................... | 81/3.29 |
| 4,067,279 | A * | 1/1978 | Lester et al. | .................... | 53/334 |
| 4,475,276 | A * | 10/1984 | Staten | ............................ | 29/229 |
| 7,086,310 | B2 * | 8/2006 | Oleksy | .......................... | 81/3.57 |
| 2007/0204451 | A1 * | 9/2007 | Fistor | ............................. | 29/229 |

* cited by examiner

*Primary Examiner* — Lee D Wilson
(74) *Attorney, Agent, or Firm* — Steven A. Nielsen; Allman & Nielsen, P.C.

(57) ABSTRACT

A snap ring installation tool includes a finger gripping portion, a middle portion which is generally integral with the finger gripping portion, an arcuate open cylindrical portion, having an interior surface and a predetermined radius of curvature matching that of the snap ring. The snap ring installation tool may be used to install a snap ring of a clothes dryer hose, an attachment ring of a garbage disposal or other application.

3 Claims, 6 Drawing Sheets

SNAP RING INSTALLATION TOOL

CROSS REFERENCES TO RELATED APPLICATIONS

The present application claims the benefit of U.S. Provisional Patent Application Ser. No. 60/778,717, filed Mar. 2, 2006 (Mar. 2, 2006).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to hand tools, and more particularly to pipe handling and plumbing tools, and still more particularly to a snap ring installation tool.

2. Discussion of Related Art Including Information Disclosed Under 37 CFR §§1.97, 1.98

Snap rings are an inexpensive and simple solution for attaching hoses to fittings. Common applications are routinely found on consumer appliances such as clothes dryer vent hoses and garbage disposal attachment rings. Plumbers and other appliance professionals have special snap ring tools, resembling pliers, that spread a snap ring so that it can be slipped over a pipe or fitting and then released to engage the pipe or fitting as a kind clamping device. Many appliance manufactures anticipate that consumers will perform their own installation and therefore include instructions specifying the tools required.

To be consumer friendly, appliance manufactures try to design connections so that the need for special tools is either minimized or entirely obviated to complete the appliance installation.

BRIEF SUMMARY OF THE INVENTION

The present invention is a snap ring tool that is inexpensive and extremely easy to use. The tool can be included with every installation kit by the manufacturers. It is also compact in size, which is an advantage over conventional snap ring pliers when working under a sink or behind a dryer.

BRIEF DESCRIPTION OF THE SEVERAL VIEWS OF THE DRAWINGS

The invention will be better understood and objects and advantages other than those set forth above will become apparent when consideration is given to the following detailed description thereof. Such description makes reference to the annexed drawings wherein.

DETAILED DESCRIPTION OF THE INVENTION

Figure 1A:
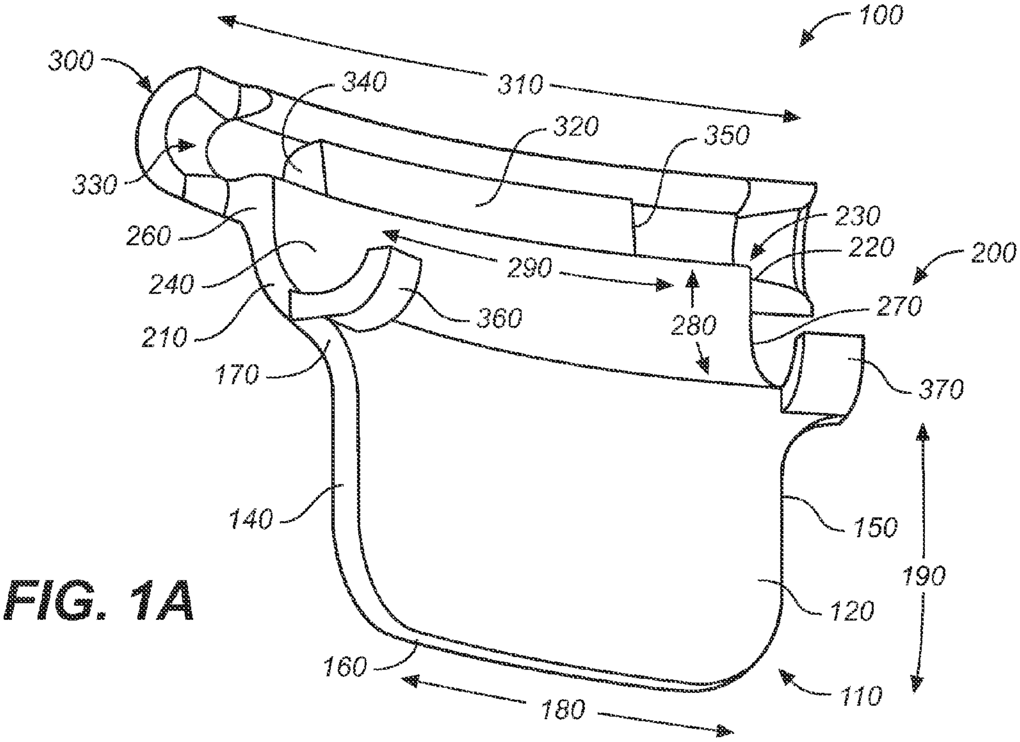
FIG. 1A is a lower left front perspective of a first preferred embodiment of the snap ring tool of the present invention.

Referring to FIGS. 1 through 5B, wherein like reference numerals refer to like components in the various views, there is illustrated therein a new and improved snap ring installation tool, generally denominated 100 herein.

Figure 1B:
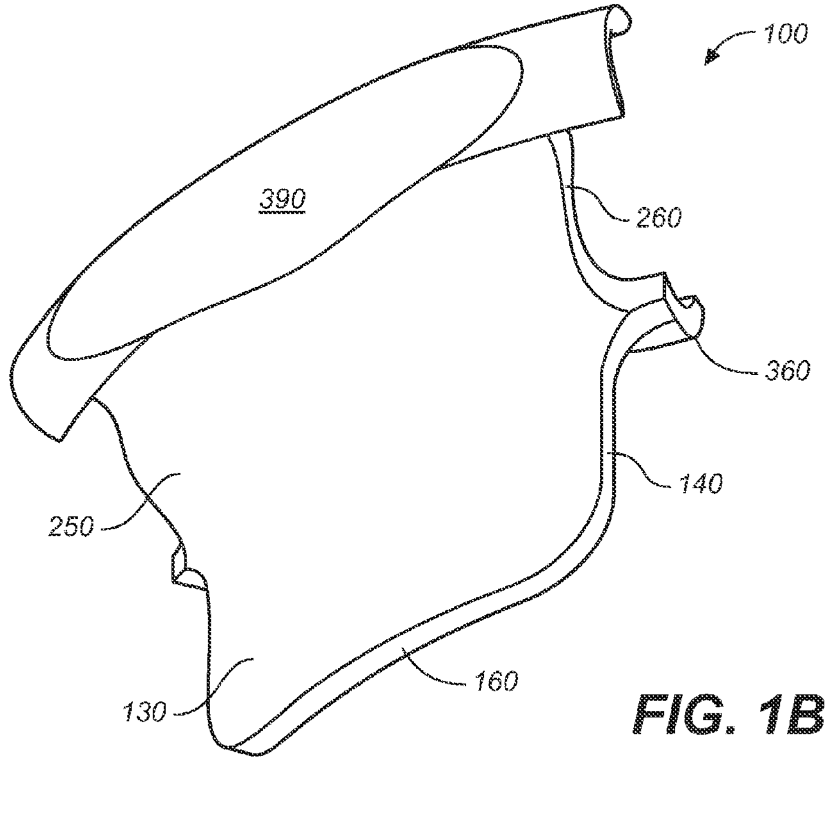
FIG. 1B is a lower left rear perspective view thereof.
Figure 2A:
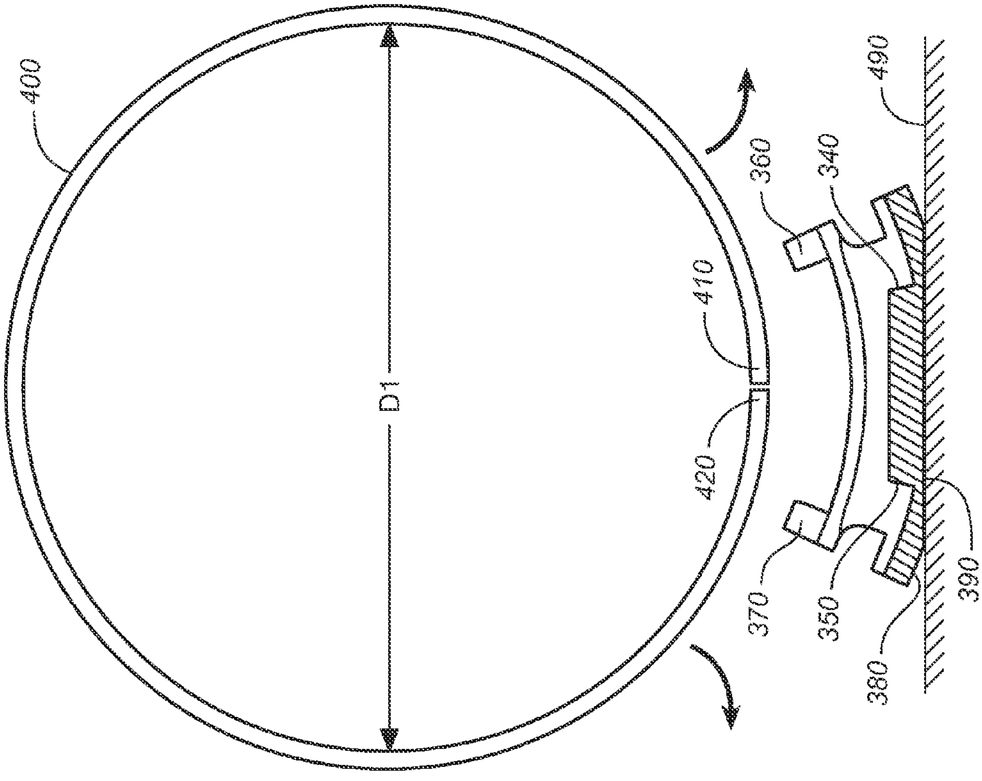
FIG. 2A is a top plan view thereof, showing a snap ring in its relaxed condition positioned above the snap ring tool shown in FIGS. 1A and 1B, shown laid on a surface.
Figure 2B:
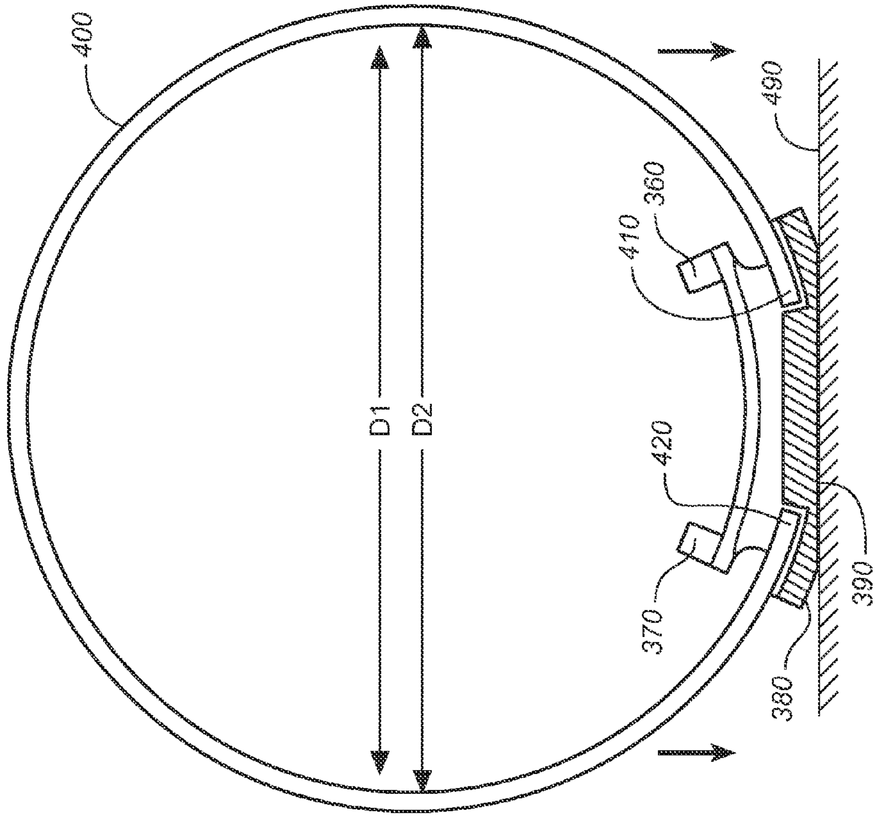
FIG. 2B is a top plan view of the snap ring of FIG. 2A in its expanded condition.

FIGS. 1A and 1B illustrate a first preferred embodiment of the snap ring installation tool and show that the tool includes a finger gripping portion 110, having a front side 120, a rear side 130, a left side 140, a right side 150, a lower end 160, and an upper end 170. The finger gripping portion is gently arcuate from the right to the left side 180, the curvature being governed by the diameter of the snap ring with which it is to be employed for installation. It may also be gently arcuate from its lower end to its upper end, thus making it doubly concave, or making it slightly cupped around two axes.

Next, the snap ring installation tool includes a middle portion 200, which angles rearwardly and upwardly from the upper end of the finger gripping portion, the degree of angle again determined by the device to be installed. The angled middle portion includes a lower end 210, which is continuous and contiguous, and generally integral, with the upper end of the finger gripping portion, and an upper end 220, which terminates in a ledge or shelf 230. Additionally, it includes a front side 240, a rear side 250, a left side, 260, and a right side 270. The angled middle portion shares the double concavity, upper to lower 280, and right to left 290, of the finger gripping portion, though the radius of curvature from top to bottom may be substantially smaller depending on the preferred dimensions.

Next, the inventive tool includes an arcuate open cylindrical portion 300 integrally disposed on the upper end 220 of the angled middle portion. The open cylindrical portion has a radius of curvature 310 matching that of the snap ring 400 for which it is to be used. A medial spacer 320, integral with and generally centered on the arcuate interior surface 330 of the open cylindrical portion includes substantially planar left and right stop walls 340, 350, respectively, which are separated a distance adapted for the optimal and minimal opening required to slip the snap ring over whatever structure is selected to be secured.

Finally, the snap ring installation tool of the present invention includes left and right arcuate projections 360, 370, respectively, disposed at the junction of the finger gripping portion upper end and the angled middle portion lower end. The arcuate projections extend outwardly from the front side 120 of the finger gripping portion finger gripping portion 110 and the front side 240 of the angled middle portion 200 and curve upwardly toward the shelf 230.

Using the installation of a garbage disposal as an example, and referring now to FIGS. 2A-4C, it will be seen that the first and second ends 410, 420 of a snap ring 400 are slightly separated. The ring has a diameter D1 when it is relaxed. By stretching the ring and approximating the ends to the stop walls 340, 350 of the medial spacer 320, the snap ring can be placed onto the snap ring tool as seen in FIG. 2B. This can be accomplished quite simply by laying the snap ring installation tool on a flat surface 490. A flat surface 390 on the rear side 380 of the tool stabilizes the tool. With the front side of the tool facing up and using both hands to stretch the snap ring, the inside diameter enlarges to a dimension D2. Once the ends have been urged against the right and left stop walls, the tension in the ring cooperates with the arcuate interior surface 330 of the open cylindrical portion and the shelf 230 to hold the ring on the tool and extending generally radially relative to the front side of the tool.

Figure 3A:
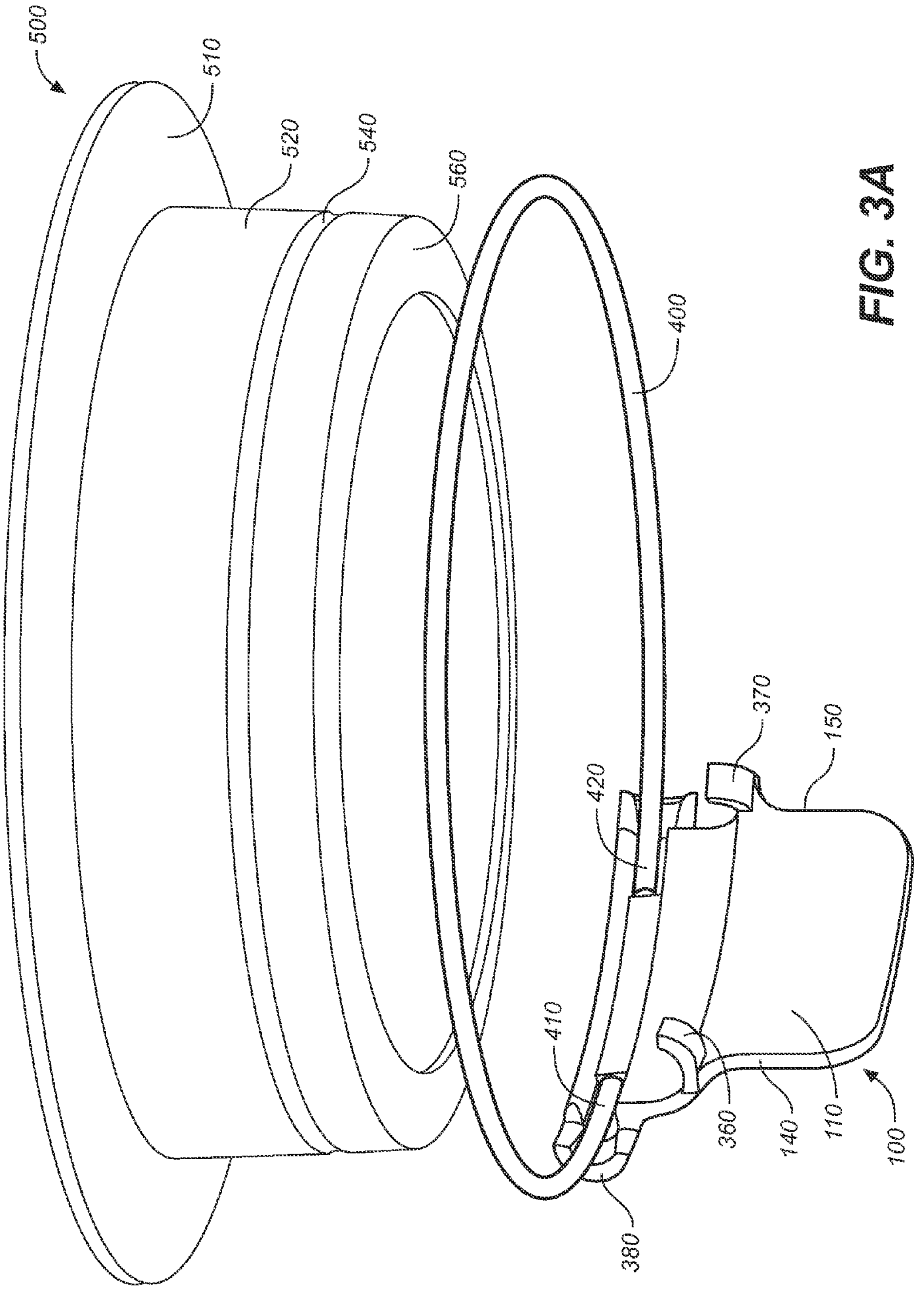
FIG. 3A is a bottom perspective view of the snap ring tool holding an expanded snap ring and poised for installation on a sink drain flange.
Figure 3B:
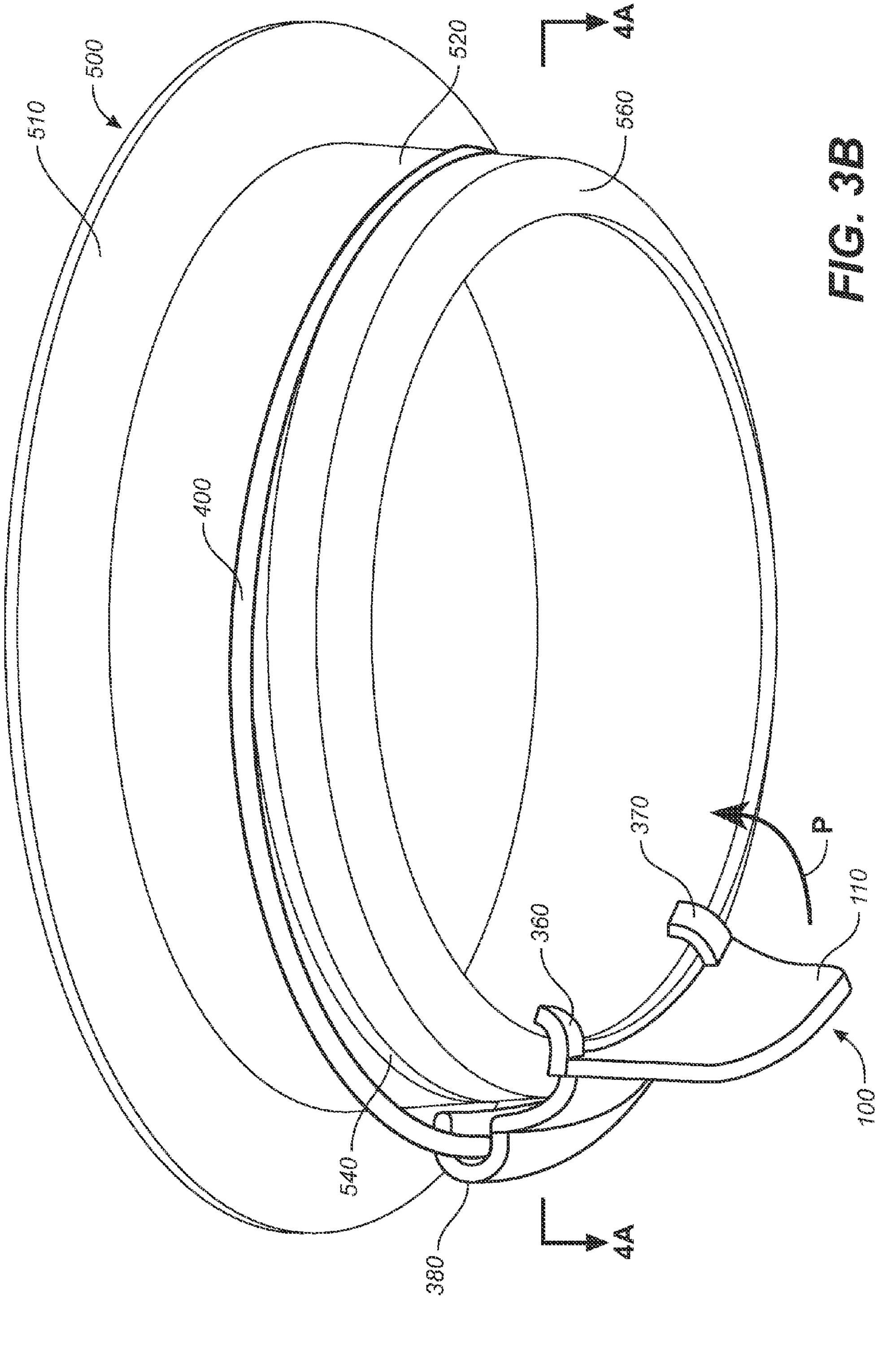
FIG. 3B is a bottom perspective view of the snap ring tool holding an expanded snap ring immediately prior to release onto a sink drain flange.

Referring next to FIG. 3A, after a sink drain flange 500 has been dropped into a sink's drain opening 610, the upper flange 510 will seal against the basin surface 620 of the sink 600. The pipe portion 520 depends downwardly from flange 510 and serves as the receiver for a mounting ring 530. Mounting ring 530 has a large annular flange 532 at its base. Extending up from base 532 is a cylindrical wall 534 with an inside diameter slightly larger than the outer diameter of snap ring 400. On top of wall 534 is a shorter wall 536 with a reduced diameter, which is closely and slidable fits around pipe 520. The transition from the diameter of wall 534 and short wall 536 is an annular ridge 550. Mounting ring 530 is vertically slipped up past an annular groove 540 in the wall 520 and held there with one hand while the other hand slips the snap ring 400, with the snap ring tool 100 holding the snap ring in an expanded condition, over the groove 540.

Figure 4A:
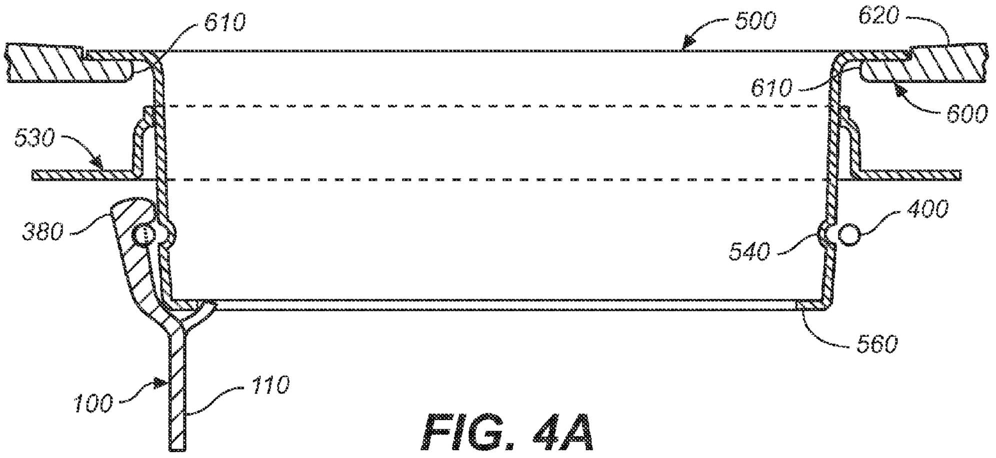
FIG. 4A is a schematic cross-section sectional side view in elevation, taken along line 4A-4A in FIG. 3B.
Figure 4B:
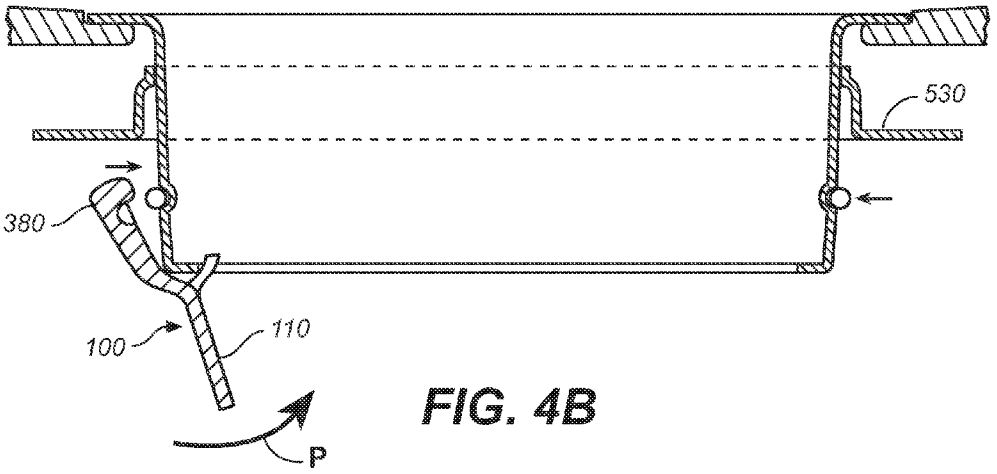
FIG. 4B is a schematic cross-sectional side view in elevation showing the motion of the snap ring tool that effects the release of the snap ring onto a flange.
Figure 4C:
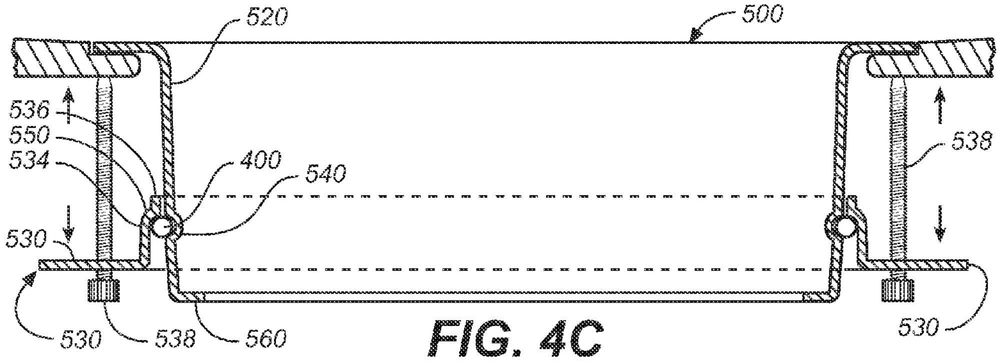
FIG. 4C is a schematic cross-sectional side view in elevation with the disposer mounting ring in place capturing the snap ring.

In FIG. 4B the snap ring tool 100 is pivoted about the bottom edge 560 of pipe 520 by pulling portion 110 of the tool toward the center of the drainpipe. The snap ring first encounters the groove 540 opposite the tool 100. As the stop walls 340 and 350 move further away from wall 520, the ends 410 and 420 become dislodged from 340 and 350 and snap back to their original position and diameter D1 which corresponds to the diameter of the groove 540. The snap ring tool is free and removed. Mounting ring 530 is lowered with wall portion 534 encircling snap ring 400 until ridge 550 encounters snap ring 400. Mounting ring 530 is prevented from moving further down pipe 520 and ring 400 is effectively captured by mounting ring 530 in groove 540.

Flange 532 has several threaded holes through which bolts 538 are attached. They are driven toward the bottom of the sink causing mounting ring 530 to push away from the sink and press flange 510 into the face of the basin. This creates a sealing force between flange 510 and the sink basin 620. It also stabilizes mounting ring 530 to make it rigid and suitable for attaching a garbage disposal.

Figure 5A:
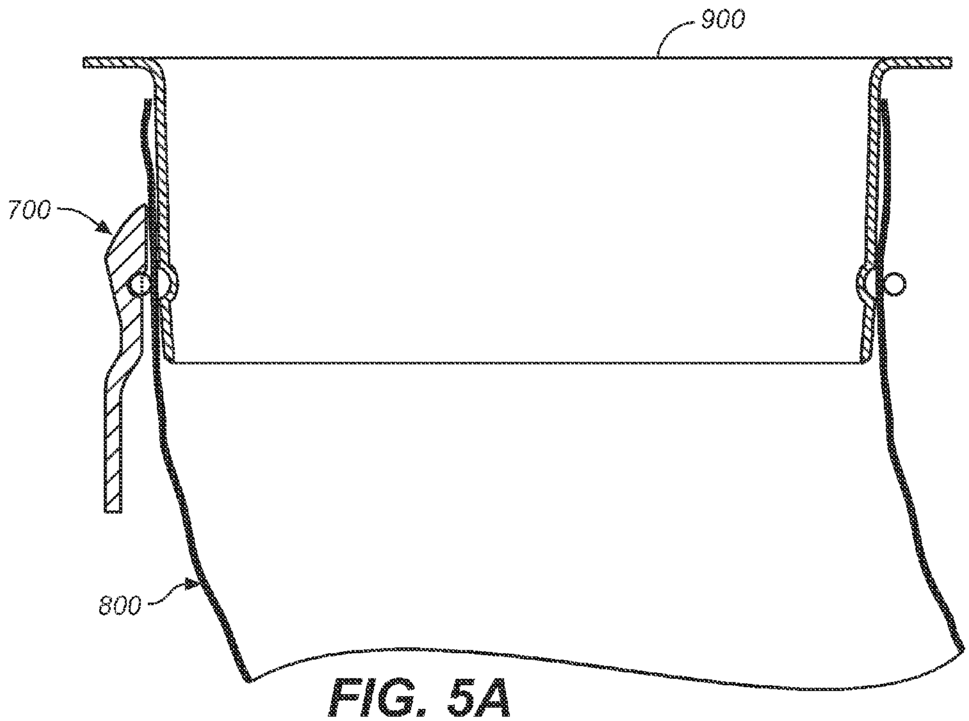
FIG. 5A is a schematic cross-sectional side view in elecation showing an alternative preferred embodiment of snap ring tool holding a snap ring over a clothes dryer exhaust flange and dryer hose.
Figure 5B:
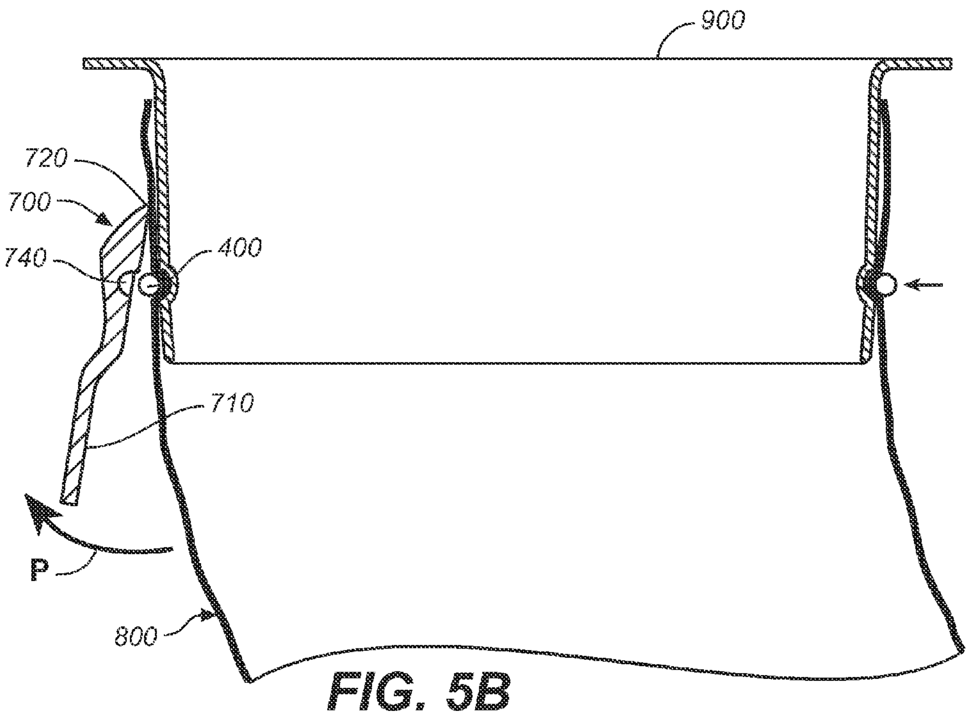
FIG. 5B is a schematic cross-sectional view showing the snap ring tool of FIG. 5A releasing a snap ring onto a clothes dryer hose holding it in place on the dryer exhaust flange.

FIGS. 5A and 5B show a second preferred embodiment of the inventive snap ring tool 700 and how it may be used for attaching a clothes dryer exhaust hose 800 to a flange 900 that comprises part of the ductwork for the dryer.

In this instance the snap ring tool 700 is pulled in the opposite direction P so the pivot point 720 is above the stop walls 740 and 750.

The foregoing disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A snap ring installation tool, comprising:

a finger gripping portion having a front side, a rear side, a left side, a right side, a lower end, and an upper end;

a middle portion having a front side, a rear side, a left side, a right side, a lower end which is generally integral with said finger gripping portion upper end, and an upper end which terminates in a ledge;

an arcuate open cylindrical portion disposed on said upper end of said middle portion and having an interior surface and a predetermined radius;

a substantially planar left stop wall and a substantially planar right stop wall disposed on said interior surface of said open cylindrical portion and separated a predetermined distance;

wherein when in use a portion of an annular snap ring may be placed in said open cylindrical portion, and when the ends of the snap ring are separated, the ends may be approximated to said left and right stop walls so as to hold the snap ring in an open configuration; and wherein the middle portion is concave on the right side from the upper end to the lower end.

2. The snap ring installation tool of claim 1, wherein the middle portion is concave on the front side from the right side of the middle portion to the left side of the middle portion.

3. The snap ring installation tool of claim 1, wherein the middle portion is concave on the front side from the upper end of the middle portion to the lower end of the middle portion and from the right side of the middle portion to the left side of the middle portion.

* * * * *